United States Patent [19]

Graser

[11] 4,240,793

[45] Dec. 23, 1980

[54] PREPARATION OF A HIGH-HIDING AND DEEPLY COLORED PIGMENTARY FORM OF PERYLENE-3,4,9,10-TETRACARBOXYLIC ACID BIS-(4'-ETHOXYPHENYL)-IMIDE

[75] Inventor: Fritz Graser, Ludwigshafen, Fed. Rep. of Germany

[73] Assignee: BASF Aktiengesellschaft, Ludwigshafen, Fed. Rep. of Germany

[21] Appl. No.: 75,123

[22] Filed: Sep. 13, 1979

[30] Foreign Application Priority Data

Sep. 30, 1978 [DE] Fed. Rep. of Germany ....... 2842721

[51] Int. Cl.[3] ....................... C09B 67/00; C07D 21/22

[52] U.S. Cl. .......................................... 8/594; 546/37

[58] Field of Search .......................... 8/83, 87; 546/37

[56] References Cited

U.S. PATENT DOCUMENTS

| | | | |
|---|---|---|---|
| 4,074,965 | 2/1978 | Kruse et al. | 8/41 R |
| 4,115,386 | 9/1978 | Gall et al. | 546/37 |

*Primary Examiner*—A. Lionel Clingman

*Attorney, Agent, or Firm*—Oblon, Fisher, Spivak, McClelland & Maier

[57] ABSTRACT

A process for the preparation of a high-hiding, deeply colored pigmentary form of perylene-3,4,9,10-tetracarboxylic acid bis-(4'-ethoxyphenyl)-imide by heating the finely divided crude pigment, which is in the form of agglomerates, formed from primary particles of length 0.15 μm or less, in cyclohexanone or a mixture of cyclohexanone and water at from 30° to 200° C., and isolating the pigment.

7 Claims, No Drawings

PREPARATION OF A HIGH-HIDING AND DEEPLY COLORED PIGMENTARY FORM OF PERYLENE-3,4,9,10-TETRACARBOXYLIC ACID BIS-(4'-ETHOXYPHENYL)-IMIDE

The present invention relates to a process for the preparation of a deeply colored and high-hiding pigmentary form of perylene-3,4,9,10-tetracarboxylic acid bis-(4'-ethoxyphenyl)-imide.

German Laid-Open Application DOS No. 2,545,701 discloses that red perylene-3,4,9,10-tetracarboxylic acid bis-(4'-ethoxyphenyl)-imide is obtained in a pigmentary form which, in full shade formulations, gives brilliant and particularly yellowish red colorations of high hiding power, if the crude pigment, which has been finely milled in a ball mill, is recrystallized from an organic liquid at an elevated temperature.

The present invention seeks to provide a pigmentary form which, whilst retaining the very pure hue in white reductions, exhibits substantially greater tinctorial strength and, in full shade formulations, has a hiding power at least as great as, and if possible greater than, that of the pigment obtainable by the method of German Laid-Open Application DOS No. 2,545,701.

Experience in the pigment field suggests that the demands for greater tinctorial strength and for equal or greater hiding power are mutually exclusive.

I have found nevertheless that according to the invention a high-hiding, deeply colored pigmentary form of perylene-3,4,9,10-tetracarboxylic acid bis-(4'-ethoxyphenyl)-imide is obtained by heating the finely divided crude pigment, in the form of agglomerates formed from primary particles of length 0.15 μm or less, in an organic liquid or a mixture of an organic liquid and water at from 30° to 200° C., and isolating the pigment, if cyclohexanone is used as the organic liquid.

The pigmentary form obtained by the process according to the invention gives very pure and brilliant yellowish red full shade colorations of great fastness, whilst in white reductions its tinctorial strength exceeds that of the pigment described in German Laid-Open Application DOS No. 2,545,701, Example 1. The hiding power in full shade formulations of the pigment obtained by the process of the present invention is at least equal to that of the conventional pigment.

In general the process is carried out by introducing the finely divided agglomerated crude pigment into cyclohexanone or into a mixture of cyclohexanone and water and keeping the suspension at the desired temperature until the high-hiding pigmentary form has been produced from the finely divided crude pigment.

The starting material may be obtained by milling the coarsely crystalline perylene-3,4,9,10-tetracarboxylic acid bis-(4'-ethoxyphenyl)-imide, obtained from its method of synthesis, in a ball mill or comminuting machinery of similar action, in the presence or preferably in the absence of milling particles, such as salts. In general, depending on the nature of the mill used and the intensity of milling which it produces, the requisite finely divided state is reached after milling for from 5 to 48 hours. For example, a starting material suitable for the process according to the invention is usually obtained by milling the crude pigment in a planetary ball mill for 5 hours. In industrial ball mills, a milling time of from 20 to 48 hours is generally required. The milled material obtained consists of agglomerates usually of 0.1 to 10 μm in size, the agglomerates consisting in the main of primary particles of from 0.02 to 0.15 μm in size.

On heating the finely divided agglomerated crude pigment in cyclohexanone or in a mixture of cyclohexanone and water, recrystallization of the fine primary particles occurs, with disintegration and dispersion of the agglomerates.

The medium in which the pigment finishing, accompanied by recrystallization, is carried out is preferably a mixture of water and cyclohexanone.

The weight ratio of cyclohexanone to water is usually from 10:1 to 1:10, advantageously from 1:6 to 3:1. The amount of liquid, i.e. of cyclohexanone or a cyclohexanone-water mixture, is not critical provided the mixture subjected to the finishing treatment is stirrable and pourable before, during and after finishing. The amount of liquid used is usually from 3 to 20, preferably from 3 to 10 parts by weight per part by weight of the finely divided crude pigment.

If a mixture of water and cyclohexanone is used it can be advantageous, because of the low solubility of cyclohexanone in water, to add a small amount of a $C_1$–$C_3$-alkanol as a solubilizing agent. Advantageously, the amount used of such an alkanol is from about 3 to 25 parts per 150 parts of water. The $C_1$–$C_3$-alkanols are ethanol, n- and i-propanol and preferably methanol. The alkanol serves to improve the dispersion of the cyclohexanone and hence the stirrability of the finishing mixture; it is not required for the finishing action per se.

The recrystallization (finishing) of the finely divided crude pigment, to give the high-hiding pigment, takes place at from 30° to 200° C., preferably at from 30° C. to the boiling point of the liquid phase. Finishing may also be carried out under pressure at temperatures above the boiling point at atmospheric pressure; in that case, the process may be carried out at up to 200° C. Advantageously, finishing is carried out under pressure from 95° to 150° C., especially from 100° to 140° C. However, for industrial practice, finishing at atmopsheric pressure is preferred.

The recrystallization is advantageously terminated when the pigment exhibits optimum tinctorial strength and optimum hiding power. Working at the boil under atmospheric pressure, this stage is in general reached after from 3 to 8 hours. The finishing mixture may be worked up in a conventional manner, for example by filtering and washing, the cyclohexanone being initially removed with a water-miscible solvent, after which the filter residue is washed with water and dried.

Preferably, however, the finishing mixture is worked up by distilling off the cyclohexanone in steam. This usually requires from 1 to 4 hours depending on the amount of cyclohexanone. The pigment may then be isolated from the aqueous suspension in a conventional manner, for example by filtration, and is dried.

The new high-hiding, deeply colored forms of the pigment may be used for the coloration of surface coatings, printing inks, baking finishes and aqueous binder paints, and for the mass-coloring of plastics. They may also be used conjointly with other pigments, especially with white pigments. In surface coatings, they give very glossy full shade colorations. Amongst uses in plastics, the coloring of plasticized PVC and the mass-coloring of polyolefins deserve special mention. Clear brilliant red hues with very good fastness characteristics are obtained.

The Examples which follow illustrate the invention. Parts and percentages referred to in the text which follows are by weight.

A. Coloration tests with the pigments obtained in accordance with the Examples were carried out as follows:

(I) 12.5% strength full shade baking finish on paper

Full shade finish:

95 g of a clear finish (a 35% strength solution of an alkyd-melamine-urea resin in xylene) and 5 g of pigment are weighed into a 370 ml glass jar. 100 ml of glass beads (diameter about 3 mm) are then added and the mixture is shaken for 60 minutes on a ®Red Devil shaker. The glass beads are then separated from the full shade finish.

Coloration:

The homogeneous finish is applied to a piece of cardboard by means of a 150 μm spiral knife coater and, after having air-dried for 20 minutes, is baked for 30 minutes at 130° C.

(II) White reduction baking finish 8 parts of the full shade finish prepared as described in A.(I) and 25 parts of a white finish comprising a 35% strength solution of an alkyd-melamine resin in xylene, pigmented with 16% of white pigment, are weighed into a dish, stirred together with a glass rod, and thoroughly mixed once more with a piece of card.

Coloration:

The homogeneous finish is applied to a piece of cardboard by means of a 150 μm spiral knife coater and, after having air-dried for 20 minutes, is baked for 30 minutes at 130° C.

EXAMPLE 1

(a) 20 g of the milled material (crude pigment) obtained as described in (b) are stirred with 150 g of water and 50 g of cyclohexanone and the mixture is then stirred for 5 hours under reflux. Thereafter, the cyclohexanone is distilled off in the course of 120 minutes by passing steam into the mixture. The product is then filtered off, washed with a small amount of hot water and dried under reduced pressure at 80° C. A bright red pigment having a specific surface area, measured by the BET method of 37 $m^2/g$, is obtained in virtually quantitative yield.

The pigment, when used according to A.(I), gives a high-hiding brilliant red coloration, whilst when used according to A.(II) it gives a deep, very pure red coloration. The colorations exhibit very good lightfastness.

(b) The finely divided crude pigment required for (a) is obtained by milling 60 g of crude coarsely crystalline perylenetetracarboxylic acid bis-(4'-ethoxyphenyl)-imide (crystal length from about 10 to 100 μm) for 5 hours in a planetary ball mill.

EXAMPLE 2

The procedure described in Example 1(a) is followed, but 12 g of methanol are added to the water-cyclohexanone mixture. This gives a more easily stirrable mixture. After working up, a bright red pigment is obtained, which has the same properties as the pigment obtained as described in Example 1.

EXAMPLE 3

The procedure described in Example 1(a) is followed, but instead of 50 g of cyclohexanone only 37.5 g are used; a bright red pigment is isolated, which has the same properties as the pigment obtained as described in Example 1.

EXAMPLE 4

The procedure described in Example 1(a) is followed but only 40 g of water and 25 g of cyclohexanone are used; a bright red pigment is obtained which has the same properties as the pigment obtained as described in Example 1.

EXAMPLE 5

300 g of the colorant powder obtained as described in Example 1(b) by milling for 5 hours on a planetary ball mill are introduced into 600 g of water, 375 g of cyclohexanone and 48 g of methanol and the mixture is refluxed for 5 hours, whilst stirring. The mixture is easily stirrable. It is worked up as described in Example 1. A bright red pigment, which has virtually the same properties as the pigment obtained as described in Example 1, is obtained in virtually quantitative yield. The specific surface area, measured by the BET method, is 36.5 $m^2/g$.

If the finishing mixture is kept at the boil for 10 hours instead of 5, the pigment obtained has slightly lower tinctorial strength, with otherwise identical properties.

EXAMPLE 6

40 g of the colorant powder obtained as described in Example 1(b) and 350 g of cyclohexanone are stirred for 5 hours at the boil, ie. 150° C. After the mixture has cooled to room temperature, it is filtered. The product is washed free from cyclohexanone with methanol, the methanol is then displaced with water, and the product is dried at 60° C. under reduced pressure. A bright red pigment, which has virtually the same properties as the pigment obtained as described in Example 1, is obtained in very good yield.

USE EXAMPLES (a) Transparent coloration in plasticized PVC 0.05 g of colorant obtained as described in Example 2, and 50 g of a mixture of 65 parts of polyvinyl chloride powder, 35 parts of di-(ethylhexyl) phthalate and 2 parts of dibutyl-tin bis-(hexyl thioglycolate) are homogenized (in about 8 minutes) on a mixing mill at 150°-160° C.; the mixture is then converted to a hide which is polished on a calender. The hides obtained exhibit a luminous red coloration having excellent lightfastness.

(b) 1:10 white reduction in plasticized PVC 0.25 g of pigment, obtained as described in Example 1, 2.5 g of titanium dioxide (rutile) and 50 g of a mixture of 65 parts of polyvinyl chloride powder, 36 parts of di-(ethylhexyl)phthalate and 2 parts of dibutyl-tin bis-(hexyl thioglycolate) are homogenized (in about 8 minutes) on a mixing mill at 150°-160° C.; the mixture is then converted to a hide which is polished on a calender. The hides obtained exhibit a pure red coloration having excellent lightfastness.

(c) 2:1 white reduction in plasticized PVC

The procedure described in Example 9 is followed, but instead of 0.25 g of colorant 0.5 g is used, and instead of 2.5 g of titanium dioxide, only 0.25 g is used; deep red hides having excellent lightfastness are obtained.

(d) Transparent coloration in rigid PVC 0.1 g of pigment obtained as described in Example 5, 100 g of polyvinyl chloride powder (emulsion polymer) and 2 g of dibutyl-tin bis-(hexyl thioglycolate) are homogenized (in about 8 minutes) on a mixing mill at 150°-160° C. The mill hide obtained is pressed to a sheet on a platen press at 140° C. under a pressure of about 0.4 kg/cm$^2$. Red moldings having excellent lightfastness are obtained.

The same result is obtained with polyvinyl chloride powder obtained by suspension polymerization.

(e) 1:10 white reduction in rigid PVC 0.1 g of pigment obtained as described in Example 5, 100 g of polyvinyl chloride powder (suspension polymer or emulsion polymer), 1 g of titanium dioxide (rutile) and 2 g of dibutyl-tin bis-(hexyl thioglycolate) are homogenized on a mixing mill, as described in Example 1(d) and the hide is then pressed to a sheet. Red pressings having excellent lightfastness are obtained. (f) 2:1 white reduction in rigid PVC 1 g of pigment obtained as described in Example 6, 100 g of polyvinyl chloride powder (suspension polymer or emulsion polymer), 0.5 g of titanium dioxide (rutile) and 2 g of dibutyl-tin bis-(hexyl thioglycolate) are homogenized (in about 8 minutes) on a mixing mill at 150°-160° C. The mill hide obtained is pressed to a sheet on a platen press at 140° C. under a pressure of about 0.4 kg/cm$^2$. Deep red pressings having excellent lightfastness are obtained.

(g) Coloration of polyethylene 0.5 g of pigment obtained as described in Example 5 and 100 g of high pressure polyethylene powder are dry-blended in a drum mixer. The mixture is fused and homogenized in an extruder at a barrel temperature of 160°-200° C. The colored plastic mass is granulated by face-cutting or by drawing strands and cooling and chopping these. The granules obtained are then converted to moldings on an injection molding machine at 200° C., or compression-molded into various shapes on a press. Red moldings having excellent lightfastness are obtained.

(h) 1:10 white reduction in polyethylene 0.1 g of the pigment of Example 5 is mixed with 100 g of high pressure polyethylene powder and 1 g of titanium dioxide (rutile), as described under (g), and the mixture is converted to red moldings having very good lightfastness.

(i) Coloration with plastic dispersion paints (1) White dispersion paint 14 g of titanium dioxide (rutile), 14 g of a microdolomite (=finely powdered calcium magnesium carbonate), and 14 g of finely milled barium sulfate (baryte) are added to 13 g of a wetting fluid which consists of 96 parts by weight of water, 2 parts by weight of 25% strength aqueous ammonia, 1 part by weight of the sodium salt of a low molecular weight polyacrylic acid and 1 part by weight of sodium hexametaphosphate; the mixture is then stirred together with 35 g of a medium-viscosity 50% strength aqueous polyvinyl propionate emulsion which contains 1 part of di-n-butyl phthalate per 100 parts of emulsion.

(2) Colored dispersion paint 20 g of pigment obtained as described in Example 5, 5 g of an adduct of 10 moles of ethylene oxide with 1 mole of nonylphenol, 25 g of ethylene glycol and 25 g of water are shaken with 100 ml of glass beads of 3 mm diameter in a 370 ml screw-cap glass jar for 60 minutes on a Red Devil®.

The pigment paste obtained is separated from the glass beads and 2 g of the paste are stirred into 98 g of the white dispersion paint obtained as described in (1) in the course of about 2 minutes, using a high-speed stirrer.

(3) Coloration method

The dispersion paint obtained as described in (2) is poured onto wallpaper and spread by means of a 100 μm spiral knife coater. The paint film is allowed to dry for about 5 hours in air. A pure red coloration having excellent lightfastness and fastness to weathering is obtained.

I claim:

1. A process for the preparation of a high-hiding, deeply colored pigmentary form of perylene-3,4,9,10-tetracarboxylic acid bis-(4'-ethoxyphenyl)-imide by heating the finely divided crude pigment, in the form of agglomerates formed from primary particles of length 0.15 μm or less, in an organic liquid or a mixture of an organic liquid and water at from 30° to 200° C., and isolating the pigment, in which process cyclohexanone is used as the organic liquid.

2. A process as claimed in claim 1, wherein a mixture of cyclohexanone and water in a weight ratio of from 10:1 to 1:10 is used.

3. A process as claimed in claim 1, wherein a mixture of cyclohexanone and water in a weight ratio of from 1:6 to 3:1 is used.

4. A process as claimed in claim 1 or 2, wherein from 3 to 20 parts by weight of liquid are used per part by weight of crude pigment.

5. A process as claimed in claim 1 or 2, wherein the mixture is heated at from 30° C. to the boiling point of the liquid phase under atmospheric pressure.

6. A process as claimed in claim 1, wherein after the heating the cyclohexanone is removed by steam distillation and the pigment is isolated.

7. Perylene-3,4,9,10-tetracarboxylic acid bis-(4'-ethoxyphenyl)imide in a pigmentary form obtained according to the process of claim 1.

* * * * *